US008532956B2

(12) United States Patent
Sengupta et al.

(10) Patent No.: US 8,532,956 B2

(45) Date of Patent: Sep. 10, 2013

(54) METHOD AND SYSTEM FOR ROTATION TRACKING OF A TURBOMACHINE COMPONENT

(75) Inventors: Anandraj Sengupta, Karnataka (IN); Paul Stephen DiMascio, Greer, SC (US); Thomas Bradley Beddard, Marietta, GA (US)

(73) Assignee: General Electric Company, Schenectady, NY (US)

( * ) Notice: Subject to any disclaimer, the term of this patent is extended or adjusted under 35 U.S.C. 154(b) by 500 days.

(21) Appl. No.: 12/258,717

(22) Filed: Oct. 27, 2008

(65) Prior Publication Data

US 2010/0106454 A1 Apr. 29, 2010

(51) Int. Cl.

*G01C 9/02* (2006.01)
*G01C 9/04* (2006.01)
*G01C 9/06* (2006.01)

(52) U.S. Cl.

USPC ............ 702/151; 702/115; 702/141; 702/150

(58) Field of Classification Search

USPC .................................. 702/151, 150, 115, 141
See application file for complete search history.

(56) References Cited

U.S. PATENT DOCUMENTS

| | | | | |
|---|---|---|---|---|
| 6,489,884 | B1 * | 12/2002 | Lamberson et al. | 340/7.2 |
| 2004/0011149 | A1 * | 1/2004 | Carroll | 73/866.1 |
| 2006/0100820 | A1 * | 5/2006 | Davidson | 702/151 |
| 2007/0078622 | A1 * | 4/2007 | Sue | 702/151 |
| 2007/0119255 | A1 * | 5/2007 | Czerw et al. | 73/621 |
| 2008/0245151 | A1 * | 10/2008 | Roney et al. | 73/628 |
| 2009/0007661 | A1 * | 1/2009 | Nasiri et al. | 73/504.03 |
| 2009/0240463 | A1 * | 9/2009 | Lee et al. | 702/141 |
| 2009/0255336 | A1 * | 10/2009 | Horning et al. | 73/504.12 |
| 2010/0026226 | A1 * | 2/2010 | Ritter et al. | 318/490 |

* cited by examiner

*Primary Examiner* — Mohamed Charioui
*Assistant Examiner* — Alexander Satanovsky
(74) *Attorney, Agent, or Firm* — Cantor Colburn LLP

(57) ABSTRACT

Disclosed is a method for tracking rotation of a turbomachine component including locating at least one tilt sensor at the turbomachine component and rotating the turbomachine component about a central axis to observe a portion of interest on the turbomachine component. The at least one tilt sensor detects an angle of rotation of the turbomachine component and transmits the angle of rotation from the at least one tilt sensor to a device which converts the angle of rotation to an indicia of the portion of interest. Further disclosed is a rotor including at least one tilt sensor and a system for tracking rotation of a turbomachine component including at least one tilt sensor and a device.

4 Claims, 3 Drawing Sheets

METHOD AND SYSTEM FOR ROTATION TRACKING OF A TURBOMACHINE COMPONENT

BACKGROUND

The subject invention relates generally to turbomachinery. More particularly, the subject invention relates to tracking of rotating components in turbomachinery.

Turbomachines undergo periodic inspections during which, among other things, turbine rotors are inspected for flaws or damage to their airfoils, or buckets. During a typical inspection, a technician will utilize a borescope or other means inserted into the turbomachine through a portal to visually inspect the buckets. While peering through the borescope, the rotor is rotated and the technician must keep track the rotor angular orientation to correctly document which buckets may have flaws or damage. This is typically done by counting the number of buckets which pass during rotation from a predetermined zero point.

This method of tracking the rotor's orientation, however, is prone to error. The inspection often involves rotating the rotor through several full revolutions and/or rotating the rotor in a first direction then in a second direction, making it difficult for the technician to keep correct count of which bucket number is being observed in the borescope. If the technician loses count, the inspection may have to be restarted costing additional time and money. Error in bucket counts may result in, for example, documenting flaws on an incorrect bucket number which may lead in turn to confusion over repairs and may also lead to reinspections further costing additional time and money. The art would well-receive an apparatus for tracking rotor rotation and bucket location that would reduce error and inspection time.

BRIEF DESCRIPTION OF THE INVENTION

According to one aspect of the invention, a method for tracking rotation of a turbomachine component includes locating at least one tilt sensor at the turbomachine component and rotating the turbomachine component about a central axis to observe a portion of interest on the turbomachine component. The method includes detecting an angle of rotation of the turbomachine component via the at least one tilt sensor.

According to another aspect of the invention, a system for tracking rotation of a turbomachine component includes at least one tilt sensor locatable at the turbomachine component, the at least one tilt sensor detecting an angle of rotation of the turbomachine component. A device is in operable communication with the at least one tilt sensor and is to convert the angle of rotation of the turbomachine component into an indicia of a portion of interest.

According to yet another aspect of the invention, a rotor includes a rotor central axis and a plurality of buckets arranged about the rotor central axis. At least one tilt sensor is located at least one bucket of the plurality of buckets, the at least one tilt sensor detecting an angle of rotation of the rotor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
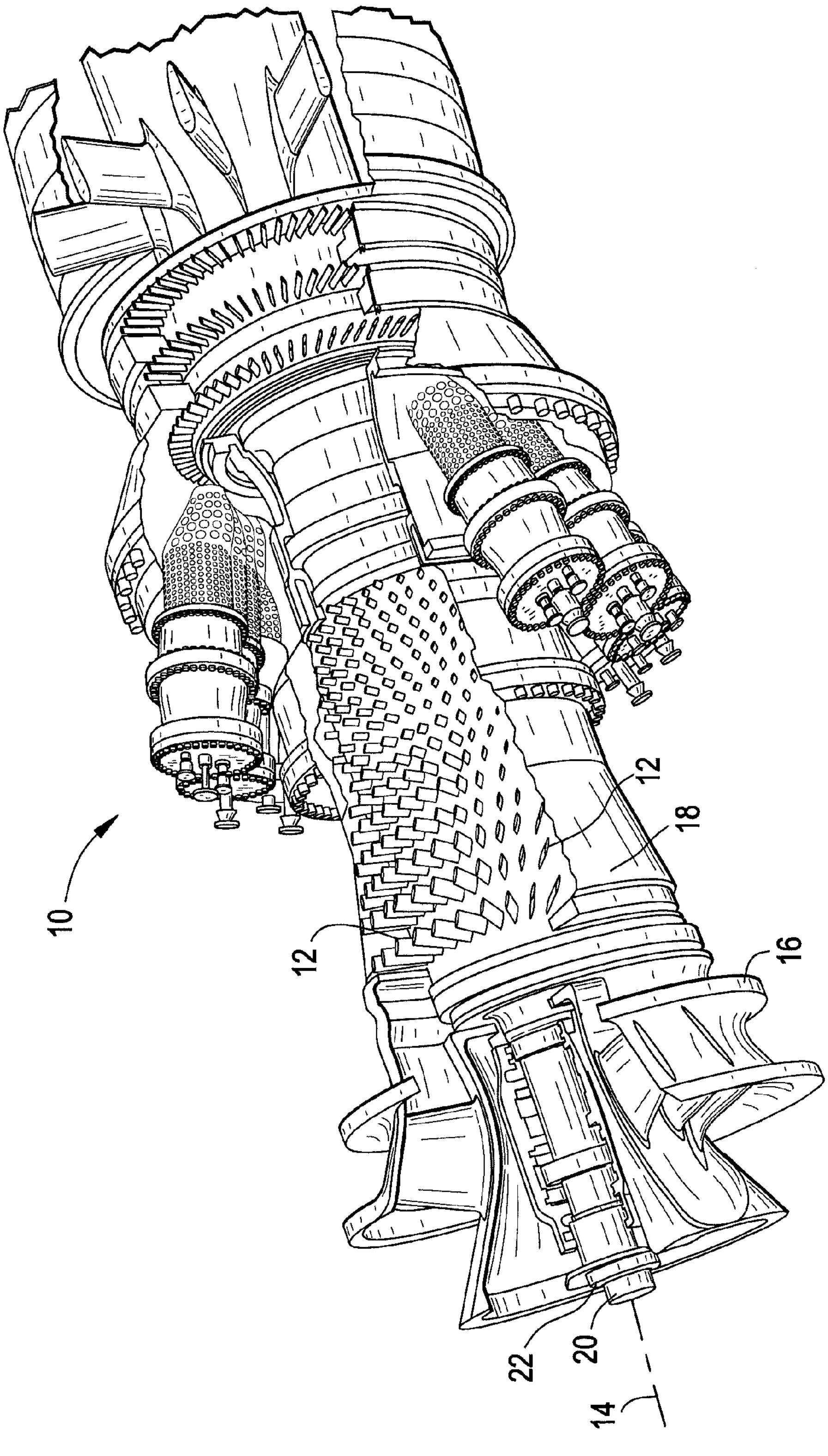
FIG. 1 is a partial cross-sectional view of a turbomachine rotor.
Figure 2:
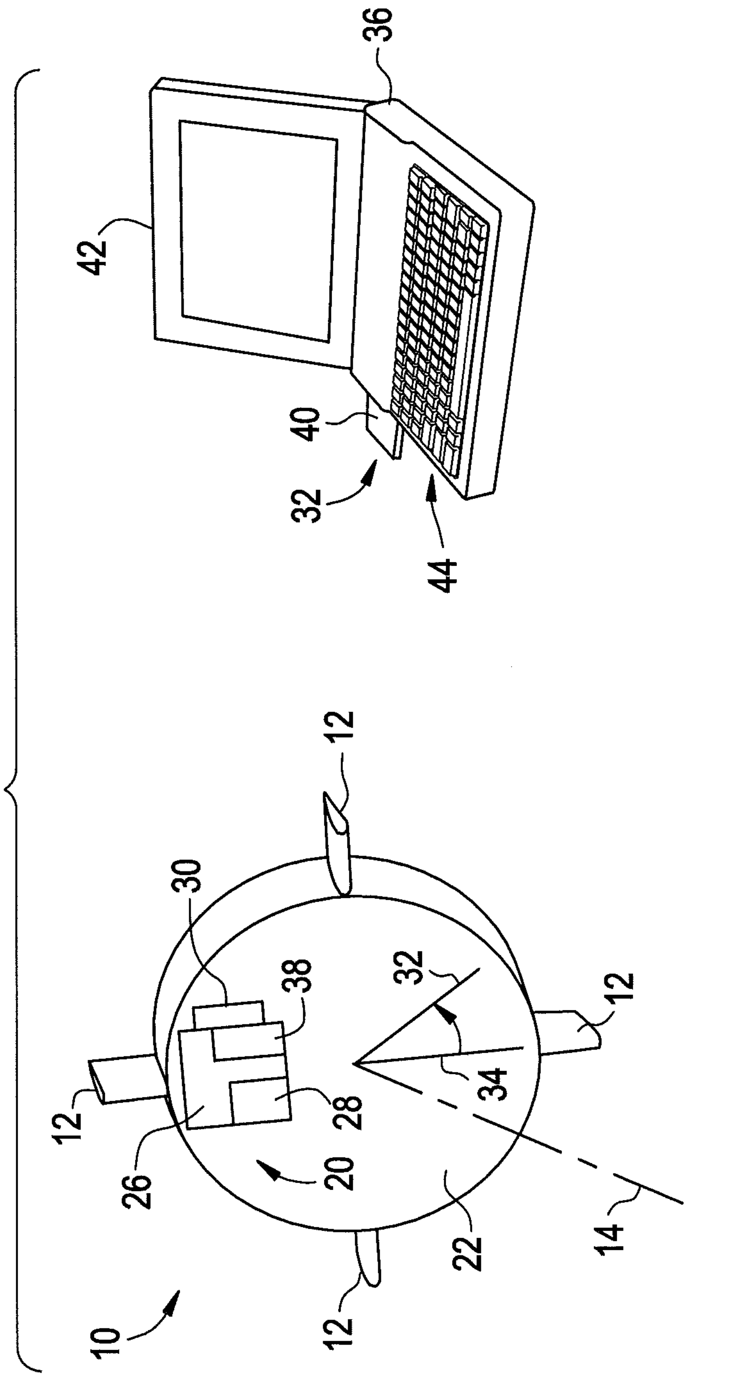
FIG. 2 is a schematic of an embodiment of a system for measuring a rotational position of a rotor.

Shown in FIG. 1 is an embodiment of a turbomachine rotor 10. The rotor 10 includes a plurality of buckets 12 and is rotatable about a rotor axis 14. The rotor 10 is located in a casing 16 and is accessible for visual inspection via at least one portal, for example, at least one borescope port 18. At least one tilt sensor 20 is disposed at the rotor 10. For example, the at least one tilt sensor 20 is disposed at a rear face 22 of the rotor 10. It is to be appreciated, however, that the at least one tilt sensor 20 may be disposed at other locations on the rotor 10, for example, at a forward face (not shown). Further the at least one tilt sensor 20 may be disposed at other rotating locations within the turbomachine, for example, a compressor, a turbine, or a generator. Referring now to FIG. 2, the at least one tilt sensor 20 comprises a micro electro-mechanical system (MEMS) accelerometer 26, and may be powered by, for example, a 4V-40 mA battery pack 28. While a MEMS accelerometer 26 is shown in the embodiment of FIG. 2, in other embodiments, the tilt sensor 20 may include, for example, an electronic or mechanical gyroscope.

The at least one tilt sensor 20 may be secured to the rotor 10 by, for example, a magnetic grip 30, or by other means such as an adhesive or by welding or brazing. The at least one tilt sensor 20 is configured to detect an angle of rotation 32 of the rotor about the rotor axis 14 from a predetermined zero point 34. As the rotor 10 is rotated about the rotor axis 14 during, for example, inspection of the rotor 10 by a technician, the tilt sensor 20 transmits the angle of rotation 32 and/or angular position to a device, for example, a computer 36. It will be appreciated that even though a computer 36 is shown in FIG. 2, it is merely exemplary. Devices including, but not limited to, handheld data collector, a personal data assistant, a borescope device, or the like may be utilized to receive the angle of rotation 32 from the tilt sensor 20.

In the embodiment of the FIG. 2, transmission of the angle of rotation 32 to the computer 36 is accomplished via a wireless transmitter 38 which transmits the angle of rotation 32 to a wireless receiver 40 operably connected to the computer 36. It is to be appreciated, however, that the at least one tilt sensor 20 may be connected to the computer 36 via a wired connection in some embodiments. When the angle of rotation 32 is transmitted to the computer 36, the computer 36 converts the angle of rotation 22 to a bucket indicia 42 by utilizing, for example, a lookup table 44. The bucket indicia 42 output by the computer 36 correlates to the bucket indicia 42 observed by the technician via, for example, a borescope or a camera (not shown), disposed at the borescope port 18, and in some embodiments is a bucket number. The lookup table 44 typically needs to be configured only once, upon initial installation of the at least one tilt sensor 20 at the rotor 10.

In one embodiment, the at least one tilt sensor 20 is installed at the rotor 10 not only for inspection purposes, but for monitoring rotation of the rotor 10 during operation of the rotor 10. In this embodiment, the at least one tilt sensor 20 is disposed at a low temperature face (not shown) of the rotor 10. With the permanent installation of the at least one tilt sensor 20, the rotation of the rotor 10 can be monitored at any time during the operation of the rotor 10, provided that the computer 36 having the lookup table 44 is operably connected either via the wireless or wired connection.

Figure 3:
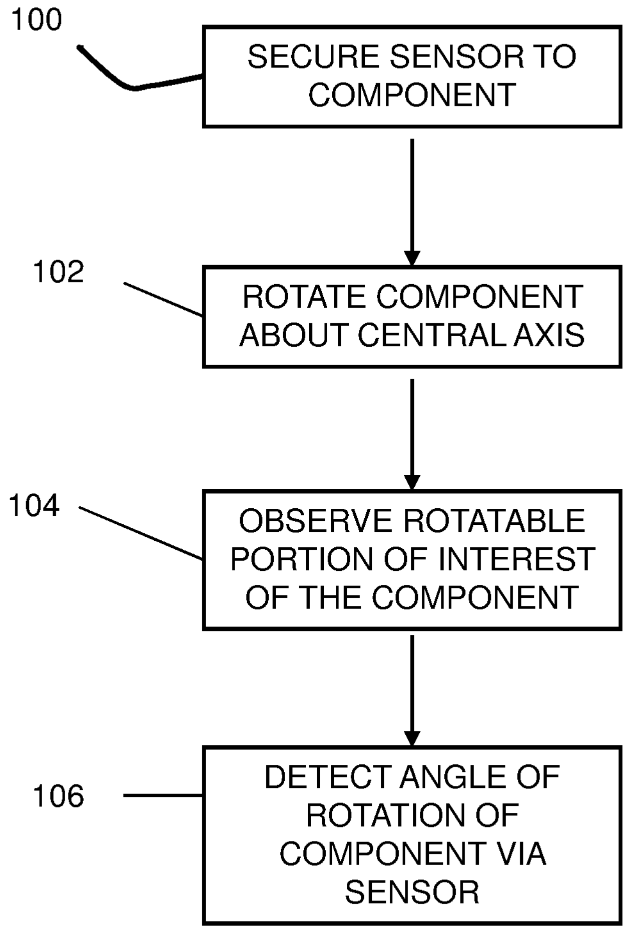
FIG. 3 is an illustration of an embodiment of a method for tracking rotation of a turbomachine component.

Referring to FIG. 3, a method for tracking rotation of the turbomachine rotor 10 is illustrated in flowchart form. In block 100, the at least one tilt sensor 20 is secured to the rotor 10. The rotor 10 is rotated about the rotor axis 14 in block 102. In block 104, the technician, via the boroscope or camera disposed at the boroscope port 18 observes a rotatable portion of interest of the rotor 10, for example, one of the buckets 12 of the rotor 10. Referring to block 106, via rotation of the at least one tilt sensor 20 with the rotor 10, the at least one tilt sensor 20 detects an angle of rotation 32 of the rotor 10 about the rotor axis 14 from the predetermined zero point 34. This angle of rotation 34 is used to determine the bucket indicia 42 of the bucket 12 observed by the technician. Use of the at least one tilt sensor 20 to track rotation of the rotor 10 enhances the accuracy of inspection by removing issues related to the technician manually counting buckets 12 to determine which bucket 12 is the subject of his inspection.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor comprising:

a rotor central axis;

a plurality of buckets disposed about the rotor central axis; and at least one tilt sensor secured to the rotor, the at least one tilt sensor detecting and transmitting an angle of rotation of the rotor, the at least one tilt sensor in operable communication with a device to convert the angle of rotation of the rotor into a bucket indicia of a bucket of interest.

2. The rotor of claim 1 wherein the at least one tilt sensor is operably connected to the device via a wireless transmitter.

3. The rotor of claim 1 wherein the at least one tilt sensor comprises a micro electro-mechanical system accelerometer.

4. The rotor of claim 1 wherein the at least one tilt sensor is secured to the rotor by at least one magnetic grip.

* * * * *